United States Patent
Osterloh et al.

(10) Patent No.: US 8,350,718 B2
(45) Date of Patent: Jan. 8, 2013

(54) SECURE COLLECTOR DIAGNOSTIC PORTAL ACTIVATION

(75) Inventors: Christopher L. Osterloh, Waseca, MN (US); James P. Ogle, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 333 days.

(21) Appl. No.: 12/773,410

(22) Filed: May 4, 2010

(65) Prior Publication Data

US 2011/0273305 A1 Nov. 10, 2011

(51) Int. Cl.
G08B 23/00 (2006.01)
(52) U.S. Cl. .............................. 340/870.02; 340/870.03
(58) Field of Classification Search ............. 340/870.02, 340/870.03
See application file for complete search history.

(56) References Cited

U.S. PATENT DOCUMENTS

| | | | |
|---|---|---|---|
| 5,539,736 A | 7/1996 | Johnson et al. | |
| 5,794,009 A | 8/1998 | Coleman et al. | |
| 6,005,759 A | 12/1999 | Hart et al. | |
| 6,032,203 A | 2/2000 | Heidhues | |
| 6,100,817 A | 8/2000 | Mason, Jr. et al. | |
| 6,256,128 B1 | 7/2001 | Lavoie et al. | |
| 6,333,975 B1 | 12/2001 | Brunn et al. | |
| 6,396,839 B1 | 5/2002 | Ardalan et al. | |
| 6,510,464 B1 | 1/2003 | Grantges, Jr. et al. | |
| 6,657,552 B2 | 12/2003 | Belski et al. | |
| 7,046,682 B2 | 5/2006 | Carpenter et al. | |
| 7,061,924 B1 | 6/2006 | Durrant et al. | |
| 7,274,305 B1 | 9/2007 | Luttrell | |
| 7,304,586 B2 | 12/2007 | Wang et al. | |
| 7,312,721 B2 | 12/2007 | Mason, Jr. et al. | |
| 7,400,264 B2 | 7/2008 | Boaz | |
| 7,401,120 B2 | 7/2008 | Wallbeck et al. | |
| 7,499,762 B2 | 3/2009 | Khorramshahi | |
| 7,535,917 B1 | 5/2009 | Son | |
| 7,616,656 B2 | 11/2009 | Wang et al. | |
| 7,741,976 B2 | 6/2010 | Crider et al. | |
| 8,125,998 B2 | 2/2012 | Anto Emmanuel | |
| 2004/0113810 A1 | 6/2004 | Mason et al. | |
| 2004/0138786 A1 | 7/2004 | Blackett et al. | |
| 2005/0240540 A1 | 10/2005 | Borleske et al. | |
| 2006/0071812 A1 | 4/2006 | Mason et al. | |
| 2006/0077999 A1 | 4/2006 | Kagan et al. | |
| 2007/0008972 A1 | 1/2007 | Sifnatsch et al. | |
| 2007/0013547 A1 | 1/2007 | Boaz | |
| 2007/0268920 A1 | 11/2007 | Allard-Jacquin et al. | |
| 2008/0074285 A1 | 3/2008 | Guthrie | |
| 2008/0144548 A1 | 6/2008 | Shuey et al. | |
| 2008/0219210 A1 | 9/2008 | Shuey et al. | |
| 2010/0278187 A1* | 11/2010 | Hart et al. ..................... 370/401 |

* cited by examiner

Primary Examiner — Joseph Chang
(74) Attorney, Agent, or Firm — Dority & Manning, P.A.

(57) ABSTRACT

Disclosed are methodology and apparatus for providing communications with an Automatic Meter Reading/Advanced Metering Infrastructure (AMR/AMI) collector device. The collector is provided with a WiFi radio that is enabled for operation from an AMR/AMI head end and turned on in response to a transmission coming from a physical device via the AMR/AMI RF LAN. A user device is granted access to the collector data only upon validation by the collector of multiple credentials that are separately presented to the collector. The credentials come from the physical device in the form of device type and device identification, and from the user device in the form of a valid security certificate and username/password combination.

20 Claims, 2 Drawing Sheets

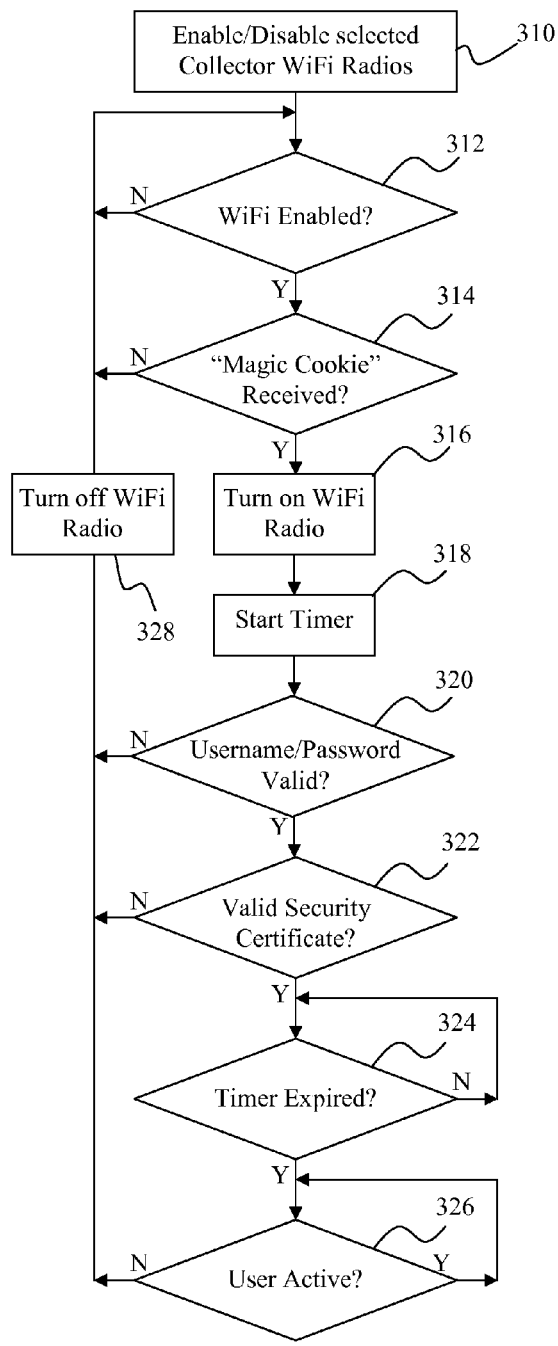
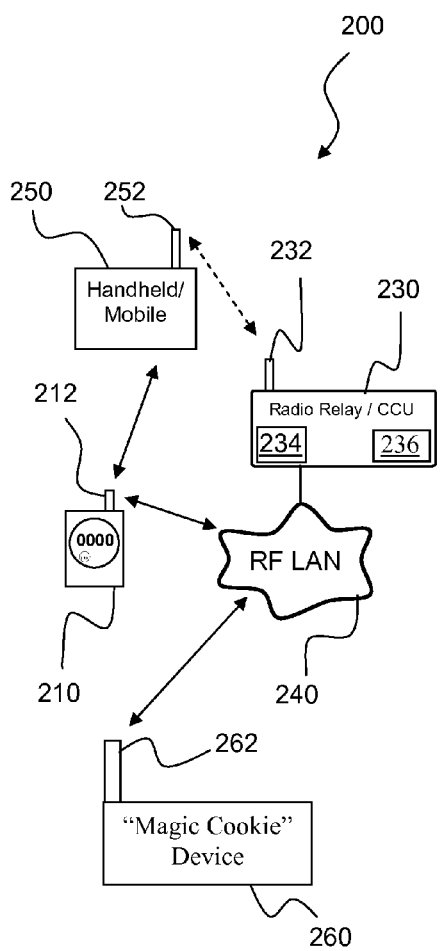
FIG. 3
FIG. 2

SECURE COLLECTOR DIAGNOSTIC PORTAL ACTIVATION

FIELD OF THE INVENTION

The present subject matter relates to Automatic Meter Reading (AMR) and Advanced Metering Infrastructure (AMI) systems. More particularly, the present subject matter relates to apparatus and methodologies for securely activating and accessing diagnostic and/or data portals in a data collector.

BACKGROUND OF THE INVENTION

In many environments including Automatic Meter Reading (AMR) and Advanced Metering Infrastructure (AMI) per present disclosure, the undertaking of continual systems improvement requires balancing of the customer's requirements for more security in their AMR and AMI systems with the need for access by service and engineering personnel. In the AMR/AMI environment, a major highlighted area of concern includes the data collectors. Such components may be located on utility poles, in municipal infrastructure, on communications towers, and on or in other relatively inaccessible locations.

An additional important aspect to the operation of a utility's AMR/AMI system is that the utility needs to have a secure operating platform that is resistant to malicious attack. However, utility providers and the original equipment supplier both have an occasional need to query the status of a collector without using the wireless area network (WAN) connection normally used to communicate with the collector, or without having to take the collector down from its mounting location, or without attaching a cable to the collector.

In view of such needs, it would be advantageous to develop ways to access collectors without having to resort to operations that would require removal of the device from service or without having to require extraordinary access efforts. Previously known subject matter has been described in U.S. Pat. No. 7,400,264 (Boaz) entitled "Automated Meter Reading System, communications And control Network For Automated Meter reading, Meter Data Collector, And Associated Methods;" in U.S. Pat. No. 7,312,721 (Mason et al.) entitled "Data Collector For An Automated Meter Reading System;" in U.S. Pat. No. 7,274,305 (Luttrell) entitled "Electrical Utility Communications And control system;" in U.S. Pat. No. 6,657,552 (Belski et al.) entitled "System And Method For Communications And control Of Automated Meter reading;" in U.S. Pat. No. 6,510,464 (Grantges et al.) entitled "Secure Gateway Having Routing Features;" in U.S. Pat. No. 6,333,975 (Brunn et al.) entitled "Method And System For Reading Intelligent Utility Meters;" and in U.S. Pat. No. 6,100,817 (Mason, Jr. et al.) entitled "Fixed Network RF Communications Complaint With Cebus Protocol."

The herein-referenced patents are hereby incorporated by reference into this disclosure for all purposes, as if fully set forth herein.

While various implementations of AMR/AMI systems have been developed, and while various communications and data collection systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology employing a multifactor authentication tied to a physical device using the RF LAN of an AMR/AMI system to access/enable a WiFi diagnostic radio associated with network CCU or Repeater type data collectors has been provided.

In an exemplary embodiment of a present configuration, a method has been provided for controlling user access to a collector in an AMR/AMI network, the network also including at least a head end and an RF LAN through which the head end communicates with the collector. Preferably, such method comprises associating a WiFi radio with the collector, transmitting a message from the head end to enable the WiFi radio, transmitting a message via the RF LAN to turn on the WiFi radio, providing a user access device capable of communicating with the WiFi radio, and verifying possession by a user of a valid username/password combination associated with the collector via transmissions from the user access device through the WiFi radio.

In certain embodiments, the method provides for transmitting a message via the RF LAN from a physical device, which message includes an identification of the physical device, and in particular embodiments the message may include a device type identification. In still further selected embodiments, the physical device and the access device may be a common device.

In particular embodiments, the method may comprise verifying possession of a valid security certification by the user access device. In still further certain particular embodiments, the method may further comprise turning off the WiFi radio after a predetermined time period. In other present exemplary embodiments, the method may comprise configuring the collector to permit communications via the WiFi radio with a single access device at a time. In selected still other embodiments, a present exemplary method may comprise configuring the collector to prevent bridging of the WiFi connection with other network communications mediums.

It is to be understood that the present subject matter also equally relates to corresponding apparatus. For example, one present exemplary embodiment relates to an AMR/AMI network comprising a head end, an RF LAN, a collector configured for communications with such head end via said RF LAN, and a WiFi radio associated with such collector and configured to provide communications between such collector and a WiFi enabled device. In such exemplary embodiment, preferably the collector is configured to permit access to such WiFi radio only upon validation of plural separately submitted credentials.

In selected present exemplary embodiments, such as the foregoing network may further comprise a physical device configured to communicate with the collector via the RF LAN to provide at least one of the plural credentials. In some alternative exemplary embodiments the physical device may further provide a serial number and device type identification as credentials to the collector.

In yet other selected alternative exemplary embodiments, a present network may further comprise a user access device configured for communications via WiFi connection with the WiFi radio, wherein the user access device is configured to present a security certification as a credential to the collector.

In additional present exemplary embodiments, the user access device may be configured to permit a user to enter a username and password to present as credentials to the collector.

In yet additional present exemplary embodiments, the present subject matter also relates to a collector for use in an AMR/AMI environment, comprising a Radio Relay or Cell Controller Unit (Radio Relay/CCU), that includes data collection components and network communications components. Such collector may further include a WiFi radio coupled with the Radio Relay/CCU for communications with at least the data collection components and an external user access device. Preferably, in such exemplary configuration, the Radio Relay/CCU is configured to require separately presented valid credentials via the network communications components and the WiFi radio before permitting access via the WiFi radio to the data collection components.

In particular further exemplary embodiments, such a collector may be further configured to require presentation of a valid device identification via the network communications components before permitting access to the data collection components. In certain other present exemplary embodiments, the collector may be further configured to require presentation of a valid security certificate and username/password combination via the WiFi radio before permitting access to the data collection components.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 2 illustrates a block diagram overview of a portion of an exemplary AMR/AMI system including an associated handheld or mobile device, a magic cookie device in accordance with present technology, and such devices' operational relationships with the AMR/AMI system; and FIG. 3 illustrates a flow chart of an exemplary present methodology for securely wirelessly connecting to an AMR/AMI collector in accordance with present technology.

Figure 1:
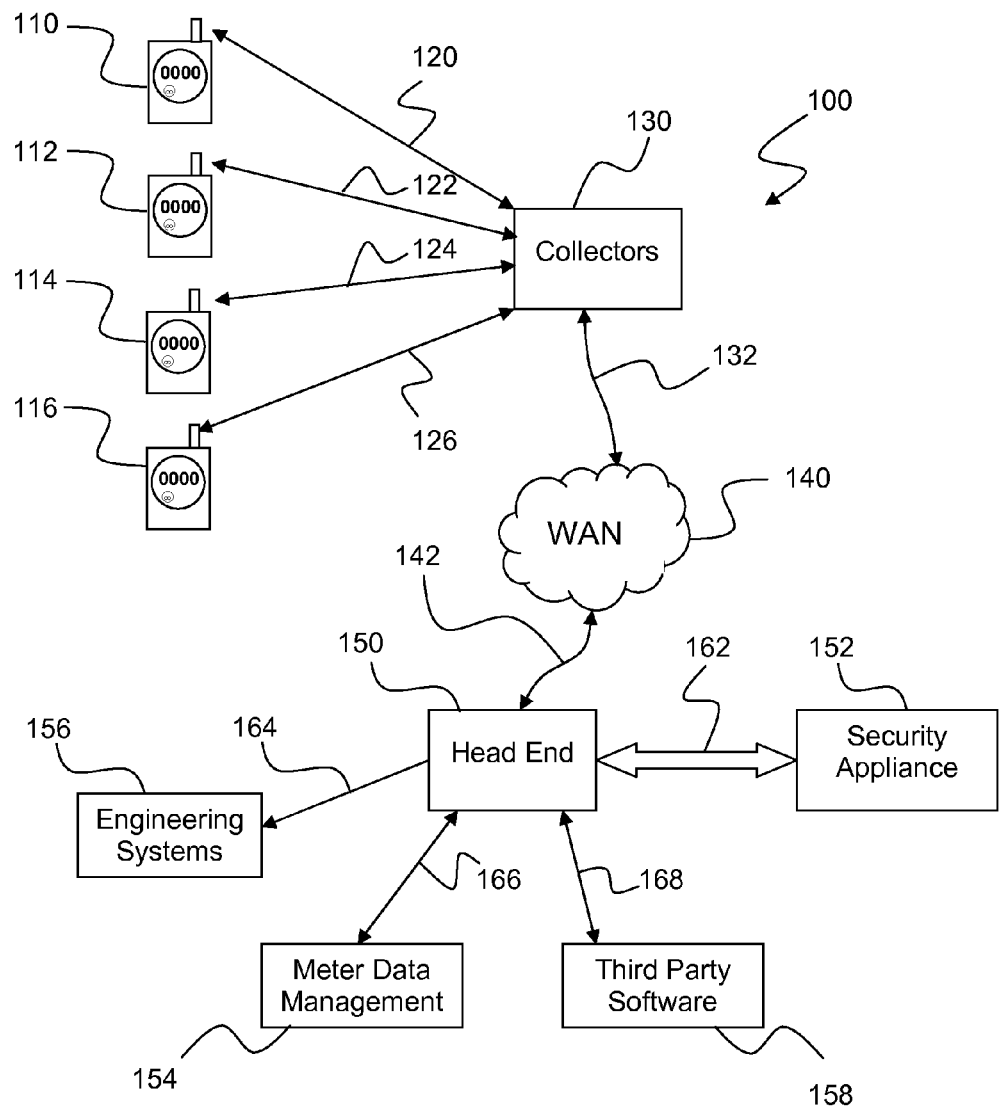
FIG. 1 is a block diagram of an exemplary AMR/AMI telemetry system with which the present technology may be employed.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with providing secure collector diagnostic portal activation in Automatic Meter Reading/Advanced Metering Infrastructure (AMR/AMI) systems.

Reference herein is made in detail to the presently preferred embodiments of the subject Secure Collector Diagnostic Portal Activation methodology. FIG. 1 illustrates an exemplary telemetry system generally 100, which may include various exemplary telemetry endpoints 110, 112, 114, and 116 located within, for example, an AMR/AMI network, and which are read by network collectors 130. Telemetry endpoints may include, but are not limited to, utility consumption meters including, for example, electricity meters, but may also include other types of devices used in conjunction with other types of consumption measurement devices such as water and gas meters. In such instances, the telemetry endpoints may also correspond to a pressure monitor, a data corrector, cathodic protection apparatus, and general telemetry apparatus. Such exemplary telemetry endpoints 110, 112, 114, and 116 may be connected for data transmission via transmission paths 120, 122, 124, and 126, respectively, to collectors 130.

It should be appreciated that while transmission paths 120, 122, 124, and 126 are presently illustrated as transmission lines, such is not a specific limitation of the present technology as data may be transmitted by any suitable technology, including via wired as well as wireless technology. In similar fashion, transmission paths 162, 164, 166, and 168 (illustrated as variously coupled data between head end associated items) may also correspond to any suitable data transmission capable device or methodology, now existing or later developed.

Those of ordinary skill in the art will appreciate that the illustration in FIG. 1 with respect to the network configuration is exemplary and that other components, for example, including but not limited to, repeaters, may also be employed. It should be appreciated that while the present subject matter is described more specifically as directed to electric AMR/AMI networks, such is not a specific limitation of the disclosure as the present disclosure may be extended to water and gas networks, or combinations thereof, as applicable, particularly as to selected portions of the present disclosure.

Further, while the present communications system is described as a network, other and additional communication forms including the use of mobile data collection apparatus may be employed within the scope of the present disclosure.

Still further, while the present disclosure describes the use of a WAN to transmit information (either data or instructions) among selected devices, such is illustrative only as other information exchange apparatus may be used to provide desired communications including, but not limited to, WAN's, LAN's, all varieties of wireless systems, and the Internet, and intended to include other later developed technologies.

In accordance with present exemplary disclosure, information from such exemplary endpoints 110, 112, 114, and 116 may be processed in the collectors 130 and sent over a WAN generally 140 to a head end system generally 150 by way of exemplary transmission paths 132, 142. The head end system 150 may further process the endpoint reading or data and send that information to other systems. Long-term storage can, of course, be provided by, for example, a meter data management (MDM) system generally 154, not presently illustrated in detail, and details of which form no particular aspect of the present subject matter.

For telemetry, there may be other systems that are not part of an AMR/AMI network, such as engineering systems generally 156, or software systems generally 158, or other components monitored by the endpoints. Other systems, not presently illustrated, may also be included in system 100. Also, the representative endpoints 110, 112, 114, and 116 are intended to be understood by those of ordinary skill in the art as representing any number of such endpoints in use in a given system configuration in accordance with present subject matter, variously and respectively associated with collectors as needed.

Collectors 130 validate the readings from the respective endpoints 110, 112, 114, and 116, and prioritize the uploading of data to the head end 150. Collectors 130 can also evaluate data from the endpoints 110, 112, 114, and 116 and generate alarms as well, per the present subject matter.

At head end 150, data is further validated, alarms may also be generated, and alarms and data are exported to an external system. Head end 150 can also accept requests from an external system (not presently illustrated) to send reconfiguration messages through the network to the endpoints 110, 112, 114, and 116, all per the present subject matter.

With reference to FIG. 2, there is illustrated a block diagram overview of a portion of an exemplary Advanced Metering System (AMS) generally 200 including an associated handheld or mobile device 250, and a magic cookie device 260 in accordance with present technology. FIG. 2 also represents the operational relationships of such various devices with the AMS 200.

AMS 200 may include, without limitation, a Radio Relay or Cell Control Unit (CCU) 230 configured to communicate via network communications components including internal radio circuitry (not separately illustrated) and an external antenna 232 with WAN 140 (FIG. 1), which may correspond at least in part with RF LAN 240. Radio Relay or Cell Control Unit (CCU) 230 is also provided with data collection components 236, which are configured to at least collect and store data from metrology devices such as exemplary metrology device 210. In accordance with present disclosure, Radio Relay or Cell Control Unit (CCU) 230 is provided with a WiFi radio 234, as is otherwise discussed more fully herein with reference to present FIG. 3. RF LAN 240 is configured to communicate by radio frequency transmissions with, inter alia, metrology device 210 by way of an associated endpoint device and associated antenna 212.

Also seen in FIG. 2 is a handheld or mobile device 250 that is configured to perform multiple tasks including meter reading operations as well as instructional transmissions of commands by way of internal radio transmission circuitry (not separately illustrated) and an external antenna 252. Handheld or mobile device 250 may also engage in the transmission of other relevant information to and from both metrology device 210 and WAN 140 (FIG. 1) by way of RF LAN 240 and Radio Relay/CCU 230. Further, in accordance with present disclosure, handheld or mobile device 250 or separate similar devices (including without limitation, laptop computers) may communicate via WiFi 234 for selected types of communications with Radio Relay or Cell Control Unit (CCU) 230, as herein otherwise further described.

With reference to present FIG. 3, there is illustrated a flow chart of an exemplary methodology for securely wirelessly connecting to an AMR/AMI collector in accordance with present technology. As previously noted, in many AMR/AMI environments, the undertaking of system improvements requires balancing of the customer's requirements for more security with the need for access by service and engineering personnel. To such end, the present technology provides for embedding the previously mentioned WiFi 234 radio into AMR/AMI data collectors 130, 230 including both Cell Control Units (CCU) and Repeater Collectors.

Those of ordinary skill in the art will appreciate that Cell Control Units (CCUs) are generally neighborhood-related devices that collect meter reading information, provide advanced metering functions, and send metering data to the host processor via a wide area communications network. Repeater Collectors provide similar capabilities but may lack some or all of the advanced metering functions.

In accordance with present technology, WiFi radio 234 is provided as an open protocol (802.11a/b/n) device and, therefore, care must be taken to secure the interface from attack. This is done in multiple stages as illustrated in the flow chart of FIG. 3.

Initially at step 310, software in head end 150 (FIG. 1) must be configured to allow WiFi radio 234 to be enabled (step 312). Such WiFi radio enablement can be set globally or on a collector by collector basis. If WiFi radio 234 is enabled by the head end software, collector 130, 230 will still leave WiFi radio 234 off until it has received a message from a special "magic cookie" device 260 (step 314), as is otherwise described more fully herein, through a Radio Access Network (RAN) illustrated herein in part as RF LAN 240 (FIG. 2).

When collector 130, 230 receives a specially formatted packet from "magic cookie" device 260 transmitted thereto via antenna 262 and RF LAN 240, (and assuming an identification of the "magic cookie" device 260 transmitted as a part of the message is validated by collector 130, 230 against a list of allowed/revoked units), collector 130, 230 will turn on WiFi radio 234 (step 316) for a predetermined time period (step 318). In an exemplary configuration, the predetermined time period may be for example five (5) minutes. During such predetermined time period, a single user may connect to the radio via the WiFi connection.

For the connection to be allowed, the user must enter a valid username and password (step 320) associated with the collector 130, 230 within the predetermined time (step 324) and the user's access device (for example, a laptop computer or, alternately, handheld/mobile device 250; FIG. 2), must possess a valid security certificate (step 322). Security certificates may be issued by the head end software or other trusted Certificate Authority. Certificates can be issued with an expiry time limit from days to years as appropriate for a given situation, and may be revoked by using standard revocation lists. The username/password may be set globally or on a collector by collector basis at the head end software.

If the user is authenticated, i.e., has a valid Magic Cookie ID, valid Certificate, and valid Username/Password, the user will be allowed to access read only collector information pages that may be stored in data collection components 236. If the user fails any of the above checks, WiFi radio 234 will shut down (step 328) and will require another valid magic cookie transmission to enable it. All successful and un-successful but attempted logins are logged and transferred to a security log at head end 150.

In accordance with present technology, a process similar to the above may also be enabled to allow access to software downloads to the collectors and repeaters. If such feature of the present technology is also implemented, a separate list of Magic Cookie ID's, Certificates, and username/password pairs for the higher level functionality are preferably required per the present subject matter.

The user may close the WiFi connection on exit; however, if the connection is left on, collector 130, 230 will automatically close the connection within a predetermined time period of no activity (step 326). In a present exemplary configuration, such time period may also be set for five minutes (or some other desired time). Collector 130, 230 is configured so as to allow only one access device to be connected via WiFi at any point in time. Further, collector 130, 230 is configured to prevent bridging between the WiFi connection and other network communications mediums such as a network's WAN backhaul.

In accordance with present technology, magic cookie device 260 corresponds to a standard remote endpoint board as commonly associated with metrology devices such as representative devices 110, 112, 114, 116, and 210. Magic cookie device 260 is assigned a device identification in the form of a serial number, a type ID set to a specific type, and is configured to transmit a specially formatted diagnostic packet upon a switch closure. In an exemplary configuration, the specific type ID may correspond to type "31" designating a Special Operations Device. In such exemplary configuration, all command and response packets may correspond to T25 network formatted packets with the structure illustrated in Table 1 below.

TABLE 1

| Field # | Byte Count | Name | Default value |
| --- | --- | --- | --- |
| 1 | 2 | Frame Sync | 16A3h |
| 2 | 1 | Protocol ID | 1Fh (Network Type) |
| 3 | 2 | Length/Hamming Code | xx/xx |
| 4 | 1 | Message Number | |
| 5 | 1 | Device Type/Subtype | Xxh |
| 6 | 4 | Device Serial Number | Xxxxxxxxh |
| 7 | Variable | Message | |
| 8 | 4 | Packet CRC | 4 Bytes |

In accordance with present technology, an exemplary command to instruct a CCU/Repeater 230 to turn on its associated WiFi radio 234 for a predetermined time period may correspond to transmitting a packet as illustrated in Table 1 from magic cookie device 260 with the Message Number field (field 4) set to a particular value, for example 175, and the Message field (field 7) set to the 32 Bit serial number of the target CCU/Repeater. If an "all call" message, that is, a message to all CCU/Repeaters, is to be sent, an ID of "0" may be sent as the Message field. Through the use of the presently described methodology, a multifactor authentication tied to a physical device that uses the AMR/AMI networks RF LAN to access and enable a more powerful WiFi diagnostic radio associated with an individual network collector has been provided whereby secure access to network collectors may be achieved.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure and the appended claims is by way of example rather than by way of limitation, and the subject disclosure and claims are not intended to preclude inclusion of such modifications, variations and/or additions to the present subject matter as would be readily apparent to one of ordinary skill in the art.

What is claimed is:

1. A method for controlling user access to a collector in an AMR/AMI network, the network also including at least a head end and an RF LAN through which the head end communicates with the collector, comprising:
   associating a WiFi radio with the collector;
   transmitting a message from the head end to enable the WiFi radio;
   transmitting a message via the RF LAN to turn on the WiFi radio;
   providing a user access device capable of communicating with the WiFi radio; and
   verifying possession by a user of a valid username/password combination associated with the collector via transmissions from the user access device through the WiFi radio.

2. A method as in claim 1, wherein transmitting a message via the RF LAN comprises transmitting a message from a physical device, which message includes an identification of such physical device.

3. A method as in claim 2, wherein transmitting a message via the RF LAN further comprises transmitting a message including a device type identification.

4. A method as in claim 3, wherein the physical device and the access device are a common device.

5. A method as in claim 1, further comprising verifying possession of a valid security certification by the user access device.

6. A method as in claim 1, further comprising turning off the WiFi radio after a predetermined time period.

7. A method as in claim 1, further comprising configuring the collector to permit communications via the WiFi radio with a single access device at a time.

8. A method as in claim 1, further comprising configuring the collector to prevent bridging of the WiFi connection with other network communications mediums.

9. An AMR/AMI network, comprising:
   a head end;
   an RF LAN;
   a collector configured for communications with said head end via said RF LAN; and
   a WiFi radio associated with said collector and configured to provide communications between said collector and a WiFi enabled device, wherein said WiFi radio is configured to maintain an inactive state until an authentication packet is received from said WiFi enabled device by said collector, and after the authentication packet is received, said WiFi radio is configured to be activated for a predetermined time period, and
   wherein said collector is configured to permit access to said WiFi radio during said predetermined time period only upon validation of plural separately submitted credentials.

10. A network as in claim 9, further comprising a physical device configured to communicate with said collector via said RF LAN to provide at least one of said plural credentials.

11. A network as in claim 10, wherein said physical device is configured to provide a serial number and device type identification as credentials to said collector.

12. A network as in claim 9, further comprising:
   a user access device configured for communications via WiFi connection with said WiFi radio;
   wherein said user access device is configured to present a security certification as a credential to said collector.

13. A network as in claim 12, wherein said user access device is configured to permit a user to enter a username and password to present as credentials to said collector.

14. A network as in claim 9, wherein said communications between said collector and said WiFi enabled device allow said WiFi enabled device read only access to collector information.

15. A network as in claim 9, wherein said WiFi radio returns to an inactive state whenever said predetermined time period elapses.

16. A network as in claim 15, wherein said WiFi enabled device initiates said inactive state of said WiFi radio upon exit.

17. A network as in claim 9, wherein only one WiFi enabled device has access to said WiFi radio at any point in time.

18. A collector for use in an AMR/AMI environment, comprising:
   a Radio Relay or Cell Controller Unit (Radio Relay/CCU), said Radio relay/CCU including data collection components and network communications components; and
   a WiFi radio coupled with said Radio Relay/CCU for communications with at least said data collection components and an external user access device,
   wherein said Radio Relay/CCU is configured to require separately presented valid credentials via said network communications components and said WiFi radio before permitting access via said WiFi radio to said data collection components.

19. A collector as in claim 18, wherein said Radio Relay/CCU is further configured to require presentation of a valid device identification via said network communications components thereof before permitting access to said data collection components thereof.

20. A collector as in claim 18, wherein said Radio Relay/CCU is further configured to require presentation of a valid security certificate and username/password combination via said WiFi radio before permitting access to said data collection components.

\* \* \* \* \*